United States Patent [19]

Russell

[11] Patent Number: 4,860,303
[45] Date of Patent: Aug. 22, 1989

[54] DOUBLE-SIDED CO-AXIAL LASER

[75] Inventor: Stephen D. Russell, Starkville, Miss.

[73] Assignee: The United States of America as represented by the Secretary of the Army, Washington, D.C.

[21] Appl. No.: 297,893

[22] Filed: Jan. 17, 1989

[51] Int. Cl.$^4$ ............................................. H01S 3/093
[52] U.S. Cl. ........................................ 372/72; 372/68; 372/54; 372/97
[58] Field of Search .................... 372/72, 68, 54, 69, 372/70, 92, 97

[56] References Cited

U.S. PATENT DOCUMENTS

| | | | |
|---|---|---|---|
| 3,521,189 | 7/1970 | Koenig | 372/72 |
| 4,150,341 | 4/1979 | Ferguson | 372/72 |
| 4,232,276 | 10/1980 | Iwata | 372/72 |
| 4,360,924 | 10/1982 | Eden | 372/69 |
| 4,672,617 | 6/1987 | Hansen | 372/54 |
| 4,799,233 | 1/1989 | Jancaitis et al. | 372/70 |

Primary Examiner—Léon Scott, Jr.
Attorney, Agent, or Firm—Hay Kyung Chang; Freddie M. Bush; James T. Deaton

[57] ABSTRACT

The solid metal current return in a typical commercial co-axial flashlamp is replaced with a light transmissive current return which permits light from either or both surfaces of the flashlamp to be used to pump dye volumes. This enables one flashlamp to pump two dye volumes simultaneously, resulting in a significant increase in the overall efficiency of the co-axial flashlamp-pumped dye laser.

8 Claims, 2 Drawing Sheets

DOUBLE-SIDED CO-AXIAL LASER

DEDICATORY CLAUSE

The invention described herein may be manufactured, used, and licensed by or for the Government for governmental purposes without the payment to me of any royalties thereon.

BACKGROUND OF THE INVENTION

In a typical co-axial flashlamp, light from only one surface, either the inner or outer surface, of the lamp is used while the other surface is covered with a solid metal foil that functions as a current return. This structure causes approximately half of the generated light to be lost. The light is lost because it cannot pass through the optically dense plasma in the discharge annulus after being reflected by the shiny return surface. Consequently, the only practical contribution of the reflected light is to raise the plasma temperature. But the plasma temperature in a co-axial flashlamp is already higher than desirable and any further rise in it is not welcome because the high temperature plasma is rich in ultraviolet radiation which pumps most dyes inefficiently and contributes to dye degradation.

SUMMARY OF THE INVENTION

A solid metal current return of the prior art is replaced with a transparent mesh or grid. The new return obstructs only a fraction of the flashlamp's surface which it encompasses and allows light from both surfaces of the flashlamp to pump two separate dye volumes simultaneously.

DESCRIPTION OF THE PREFERRED EMBODIMENT

Figure 1:
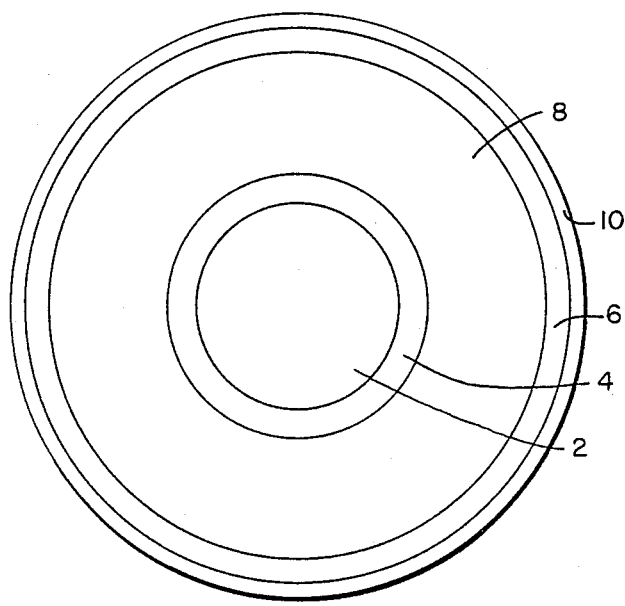
FIG. 1 is an end view of a typical commercial co-axial flashlamp.

Referring now to the drawings wherein like numbers refer to like parts, FIG. 1 shows the end view of a typical commercial co-axial flashlamp. Hollow cylindrical, quartz tubes 4 and 6 are concentric with one another. Between these tubes is a discharge annulus 8 where the light is generated and which is filled with optically dense plasma. Surrounding the outer cylindrical tube 6 is a solid metal foil 10 that functions as a reflector and as a current return. In such a flashlamp, light from only one surface of the lamp is used to pump dye volume 2. This suggests that approximately half of the light generated in the discharge annulus is lost because it cannot be reflected through the opaque plasma by the shiny return surface.

Figure 2:
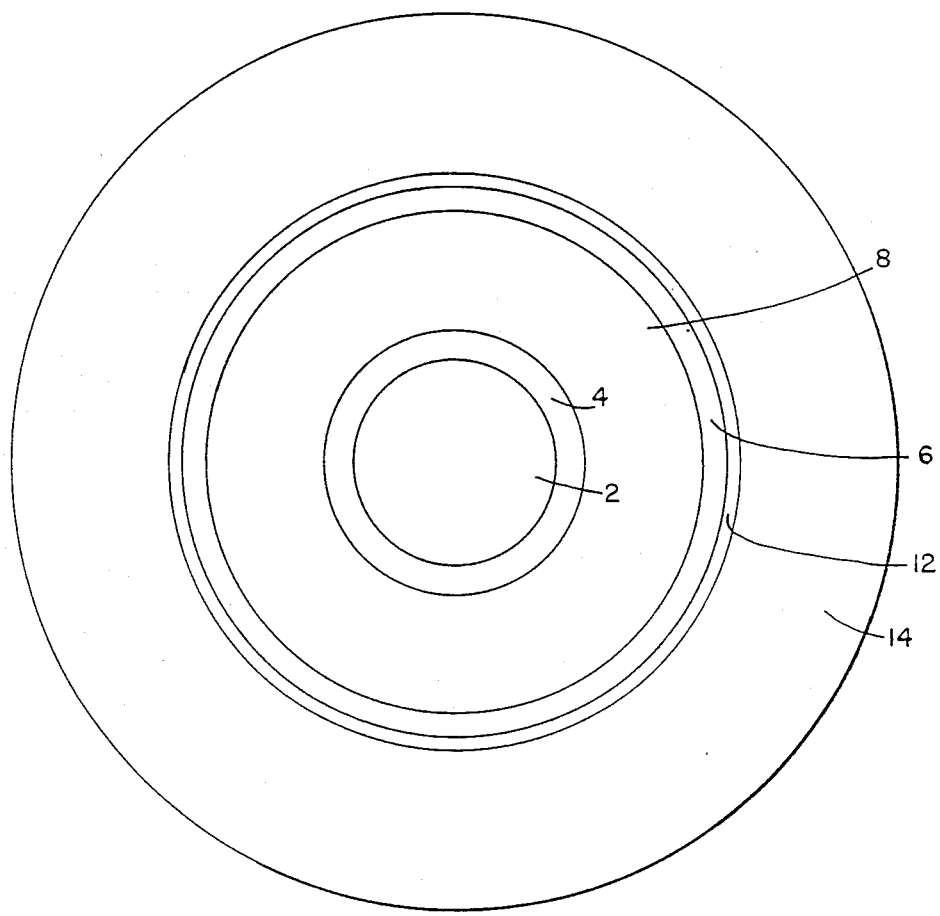
FIG. 2 shows a preferred embodiment of applicant's invention.
Figure 3:
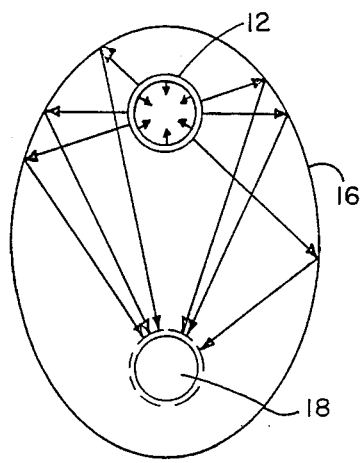
FIG. 3 illustrates another embodiment of the invention in a co-axial flashlamp to pump two dye volumes simultaneously.
Figure 4:
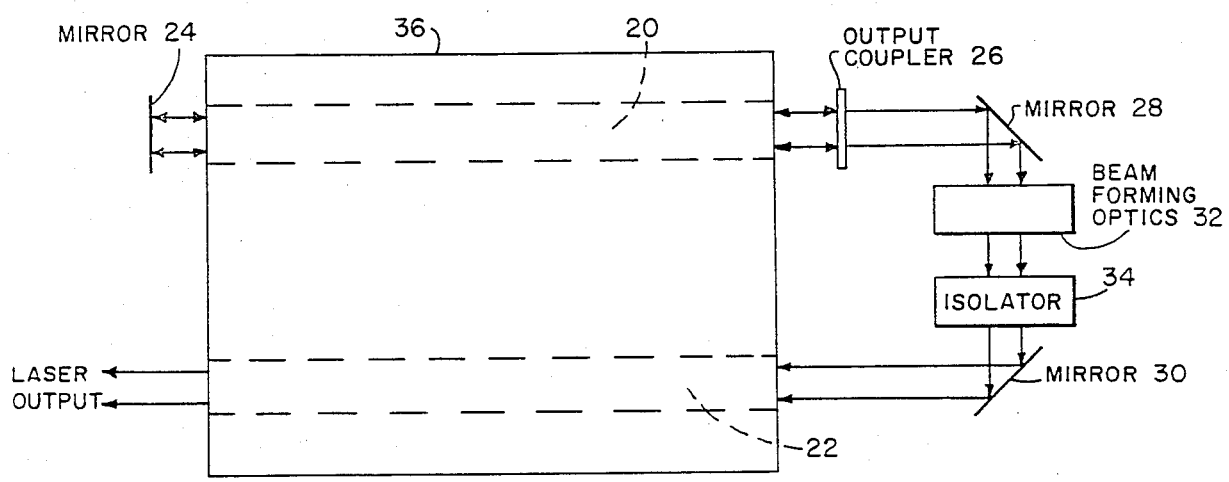
FIG. 4 illustrates a use of the invention in an oscillator-amplifier system.

FIG. 2 shows a wire mesh, one type of light transmissive current return, that replaces the solid metal current return. Such a mesh blocks only a small amount of the flashlamp light while still providing a return current path and can be used in a co-axial flashlamp to pump two dye volumes simultaneously. Wire mesh return 12 permits light to pass through outwardly and away from the center of the concentric cylindrical tubes 4 and 6. Dye volume 2 is pumped as in FIG. 1 and, in addition, a second dye volume 14 is pumped by the light emanating through the wire mesh 12. Hence, with the same amount of light generated as in FIG. 1, two dye volumes are pumped simultaneously, resulting in an increase by more than 50% in the overall efficiency of the co-axial flashlamp-pumped dye laser. The light transmissive current return also enables the flashlamp to be used in an ellipsoidal type reflector like a linear lamp while simultaneously functioning as a co-axial lamp. FIG. 3 illustrates this. Light passing through the mesh return 12 of the flashlamp located at one focus of the ellipsoidal reflector hits the reflective inner surface 16 of the reflector and is bounced off of it toward the other focus of the ellipsoidal reflector. A second dye volume 18 located at this focus is pumped by the light reflected from the inner surface of the reflector. Such a double-sided co-axial laser may be used to pump two separate gain media with either the same or different dyes in the dye cells or it may be used to pump two gain media which is an oscillator-amplifier system as shown in FIG. 4.

Oscillator 20 and amplifier 22 are contained in one housing 36 and are of the same medium. The oscillator is positioned between 100% reflective mirror 24 and partially transmissive mirror 26 which out couples a fraction of the light. The light is then directed by a mirror 28 positioned at 45° to the angle of the beam path through beam forming optics 32 and isolator 34 toward another 45° mirror 30 which further directs the light into the amplifier 22. The laser beam emerges from the amplifier in an amplified state.

Although particular embodiments and forms of this invention has been illustrated, it is apparent that various modifications and embodiments of the invention may be made by those skilled in the art without departing from the scope and spirit of the foregoing disclosure. One such modification is surrounding either the flashlamp or the dye tube with a cylinder of converter dye to move photons into a pump band for the laser dye. Accordingly, the scope of the invention should be limited only by the claims appended hereto.

I claim:

1. In a co-axial flashlamp of the type having a hollow outer cylinder, a hollow inner cylinder, said inner cylinder located concentrically within said outer cylinder so as to provide a cylindrical discharge annulus between said cylinders, plasma contained within said annulus, a first dye volume contained within the hollow of said inner cylinder, the improvement comprising a transparent, cylindrical return conductor surrounding said outer cylinder to permit radiation to issue through said conductor away from the center of said concentric cylinders, and a second dye volume, said second dye volume being situated to receive and be activated by said radiation.

2. A co-axial flashlamp as set forth in claim 1, wherein said transparent cylindrical return conductor is a cylindrical wire mesh.

3. A co-axial flashlamp as set forth in claim 2, wherein said outer and inner cylinders are made of transparent, nonconductive, nonreactive material.

4. A co-axial flashlamp as set forth in claim 3, wherein an ellipsoidal reflector surrounds said conductor and said second dye volume, said reflector having a reflective inner surface for reflecting said radiation issuing from said conductor, said first dye volume is located at one focus of said ellipsoidal reflector and said second dye volume is located at the other focus.

5. A co-axial flashlamp as set forth in claim 3, wherein said second dye volume concentrically surrounds said conductor.

6. A co-axial flashlamp for pumping two dye volumes simultaneously, comprising:

a first hollow cylinder, a second hollow cylinder, said first cylinder located concentrically within said second cylinder so as to provide a cylindrical discharge annulus between said cylinders, plasma within said annulus, a first dye volume within the hollow of said first cylinder, a transparent, cylindrical return conductor surrounding said second cylinder to permit radiation to issue through said conductor away from the center of said concentric first and second cylinders, a second dye volume located to receive said radiation issuing from said conductor.

7. A co-axial flashlamp as set forth in claim 6, wherein an ellipsoidal reflector surrounds said conductor and said second dye volume, said reflector having a reflective inner surface for reflecting said radiation issuing from said conductor, said first dye volume is located at one focus of said ellipsoidal reflector and said second dye volume is located at another focus of said ellipsoidal reflector.

8. A co-axial flashlamp as set forth in claim 6, wherein said second dye volume concentrically surrounds said conductor.

* * * * *